(12) United States Patent
Cleland (10) Patent No.: US 11,926,518 B1
(45) Date of Patent: Mar. 12, 2024

(54) SHUTOFF VALVE SYSTEM FOR DISPENSING A BEVERAGE

(71) Applicant: Cleland Sales Corporation, Los Alamitos, CA (US)

(72) Inventor: James M Cleland, Los Alamitos, CA (US)

(73) Assignee: Cleland Sales Corporation, Los Alamitos, CA (US)

( * ) Notice: Subject to any disclaimer, the term of this patent is extended or adjusted under 35 U.S.C. 154(b) by 584 days.

(21) Appl. No.: 15/181,086

(22) Filed: Jun. 13, 2016

(51) Int. Cl.
  *B67D 1/00* (2006.01)
  *B67D 1/12* (2006.01)
  *F16K 31/18* (2006.01)

(52) U.S. Cl.
  CPC ......... *B67D 1/1252* (2013.01); *B67D 1/0021* (2013.01); *B67D 1/0058* (2013.01); *F16K 31/18* (2013.01); *B67D 2001/0094* (2013.01)

(58) Field of Classification Search
  CPC .. B04B 3/00; B04B 9/10; B04B 11/05; B04B 11/08; B67D 1/0021; B67D 1/0058; B67D 2001/0094; B67D 1/1252; B67D 1/0027; B67D 1/1243; B01F 15/0495; F16K 31/18; F16K 31/22; F16K 31/24; F16K 31/1262; F16K 11/04; F16K 11/044; A47J 31/461; A47J 31/468; A47J 31/56; A47J 31/465; A47J 31/469; A47J 31/44; A47J 37/067; A47J 27/16; F28D 15/0283; F01M 11/045; F04F 3/00; Y10T 137/3109; Y10T 137/87652

USPC ... 99/323.1, 323.2, 330, 275, 279, 293, 403, 99/407, 408, 409, 452, 453, 470, 474, 99/280, 288, 290, 295, 323.3; 137/565.01, 87.01; 222/66; 417/46
See application file for complete search history.

(56) References Cited

U.S. PATENT DOCUMENTS

| 2,865,534 | A | | 12/1958 | Barnes | |
|---|---|---|---|---|---|
| 3,805,522 | A | * | 4/1974 | Sheppard | B23P 15/16 60/290 |
| 3,868,061 | A | * | 2/1975 | Hehl | B29C 45/234 239/533.15 |
| 4,189,991 | A | * | 2/1980 | Haddad | A47J 31/0684 99/302 R |
| 4,234,350 | A | * | 11/1980 | Suzor | C13B 20/00 127/12 |
| 4,406,382 | A | | 9/1983 | Roth | |
| 4,467,941 | A | | 8/1984 | Du | |
| 4,795,061 | A | * | 1/1989 | Peckjian | B67D 1/0016 222/129.2 |

(Continued)

*Primary Examiner* — Helena Kosanovic
*Assistant Examiner* — Tiffany T Tran
(74) *Attorney, Agent, or Firm* — Fish IP Law, LLP (57) ABSTRACT

A shutoff valve system for dispensing beverage from an open source syrup tank is presented. The shutoff valve system includes a syrup inlet receiving syrup from the open source syrup tank and a syrup outlet dispensing the syrup to a pump. The shutoff valve also includes a water inlet receiving water, and a water outlet dispensing the water to a dispensing point. Two distinct inlets and outlets for syrup and water prevent the syrup and water being mixed in the shutoff valve. The shutoff valve system further includes an actuator rod that is configured to block the water outlet in response to a pressure change at the syrup inlet, where the pressure change is caused by air flow from the syrup inlet.

17 Claims, 4 Drawing Sheets

(56) References Cited

U.S. PATENT DOCUMENTS

| | | | |
|---|---|---|---|
| 5,082,143 A * | 1/1992 | Schramm, Jr. | G07F 13/065 |
| | | | 222/129.1 |
| 5,215,128 A | 6/1993 | Neeser | |
| 5,299,715 A * | 4/1994 | Feldman | B67D 1/1243 |
| | | | 222/129.1 |
| 5,316,180 A | 5/1994 | Cleland | |
| 5,445,186 A | 8/1995 | Richter et al. | |
| 5,678,601 A * | 10/1997 | Engel | G05D 16/2095 |
| | | | 137/486 |
| 6,234,349 B1 * | 5/2001 | Bilskie | B67D 1/006 |
| | | | 222/129.2 |
| 6,293,430 B1 | 9/2001 | Haselden | |
| 6,481,456 B1 * | 11/2002 | Falkner | F16K 24/048 |
| | | | 137/202 |
| 8,876,488 B2 | 11/2014 | Fong | |
| 2005/0145278 A1 * | 7/2005 | Igawa | F16K 31/1268 |
| | | | 137/486 |
| 2012/0224987 A1 * | 9/2012 | Jones | F04B 19/22 |
| | | | 417/420 |
| 2013/0025467 A1 * | 1/2013 | Schroeder | A47J 31/402 |
| | | | 99/323.3 |
| 2014/0034161 A1 * | 2/2014 | Fong | B67D 1/1243 |
| | | | 137/565.01 |
| 2015/0157168 A1 * | 6/2015 | Burrows | A47J 31/0576 |
| | | | 426/231 |

\* cited by examiner

SHUTOFF VALVE SYSTEM FOR DISPENSING A BEVERAGE

FIELD OF THE INVENTION

The present invention relates to beverage dispensing assemblies, more specifically, a beverage dispensing assembly with a post-mix nozzle and a pump and valve assembly and methods for automatic shutoff of diluents flowing through beverage dispensing assemblies when a source of syrup is depleted.

BACKGROUND

The following description includes information that may be useful in understanding the present invention. It is not an admission that any of the information provided herein is prior art or relevant to the presently claimed invention, or that any publication specifically or implicitly referenced is prior art.

Post-mix beverage dispensing assemblies that include separate sources for syrup and water are generally known in the art. In these assemblies, syrups from a bag in box syrup source and carbonated water from the carbonated water source mixed in a nozzle and then flows into a container. However, these assemblies fail to provide a system to monitor and coordinate dispensing of syrup and carbonated water. Thus, when the amount of the syrup in the box syrup source is low, these assemblies often allow the carbonated water to flow into the container without being mixed with the syrup, which may result in dispensing beverages without syrups mixed therein.

Many technologies have been developed to use vacuum to control beverage dispensing when the syrup level is low. For example, U.S. Pat. No. 5,215,128 to Nesser utilizes a ball in the supply line. In this system, the ball in the supply line drops as the tank is being emptied and vacuum is created in the supply line by dropped ball. Then, the valve senses the vacuum such that the valve changes over to other supply syrup tank. For another example, U.S. Pat. No. 4,467,941 to Du discloses a low flow rate, positive displacement pump. In this system, air ingestion into the dispensing system is eliminated by use of a novel air trap/filter adapted to generate a high vacuum signal at the intake port of the pump in response to detecting the presence of air or encountering a syrup depletion condition which signal automatically discontinues pump operation.

Some have sought to solve the problem by utilizing a syrup dosing valve. For example, U.S. Pat. No. 5,299,715 to Feldman discloses a pressure sensitive element that detects the syrup supply level, which disables operation of shut-off valve through solenoid once pressure in the line drops as a result of the syrup reservoir becoming empty. For another example, U.S. Pat. No. 5,316,180 to Cleland discloses a syrup-actuated switching device. In this device, a float is buoyed and pivoted up by syrup in the chamber to a nearly horizontal position where the magnet actuates the switch to a closed position. When the supply of syrup to the machine is exhausted, the float pivots downwardly, moving the magnet away from the switch and causing the switch to open.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

However, none of above systems can be effectively used in an open beverage system. Thus, there is still a need for improved system and methods for controlling beverage dispensing in the open beverage system.

SUMMARY OF THE INVENTION

The inventive subject matter provides a shutoff valve system and methods for dispensing beverage from an open source syrup tank.

One aspect of the invention includes a shutoff valve system for dispensing beverage from an open source syrup tank. The shutoff valve includes at least two inlets and two outlets. The shutoff valve receives syrup from the open source syrup tank through the first inlet, and receives water from the water source through the second inlet. The shutoff valve dispenses the syrup to a pump through the first outlet and dispenses water to the dispenser through the second outlet. In a preferred embodiment, the shutoff valve also includes an actuator rod that is configured to block the second outlet in response to a pressure change at the first inlet, which is caused by air flow from the first inlet.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of properties such as dimensions used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The present invention provides apparatus, systems, and methods in which water flow through a beverage dispensing system can be automatically shut off to prevent dispensing over-diluted beverage, when the a source of syrup is depleted. The beverage dispensing system includes an open source syrup tank and a shutoff valve (e.g., a soda/syrup shutoff valve), which responds to a level of the syrup contained in the open source syrup tank. Syrups can be delivered to the system via any appropriate source, including canisters, tubes, cartridges, pressurized vessels, bladders, or via a bag-in-a-box. It is contemplated that such sources may be self-pressurized, may be pressurized by a pump, or may rely upon gravity to propel the syrup into the system.

In one aspect of preferred embodiments, the shutoff valve of the beverage dispensing system is operated at least in two different modes, including (a) a shutoff mode and (b) a flow mode. In the shutoff mode, the shutoff valve operates to prevent flow of the water from a water tank to a beverage dispenser in response to a lowered level of syrup in the open source syrup tank. In the flow mode, the shutoff valve operates to allow water flow from the water tank to the beverage dispenser.

In some embodiments, the shutoff valve changes its operation from the flow mode to the shutoff mode based on the volume of the syrup. For example, the shutoff valve changes its operation from the flow mode to the shutoff mode when a volume of the syrup is less than 20% of the volume of the open source syrup tank. In other embodiments, the shutoff valve changes its operation from the flow mode to the shutoff mode based on the level of the syrup in the tank. For example, the shutoff valve changes its operation from the flow mode to the shutoff mode when a level of the syrup (e.g., height of the syrup pool, etc.) is less than 20% of the height of the open source syrup tank. For another example, the shutoff valve changes its operation from the flow mode to the shutoff mode when the level of the syrup (e.g., height of the syrup pool, etc.) is lower than a structure (e.g., a tube, a fluid line, etc.) inside of the open syrup tank.

Figure 1:
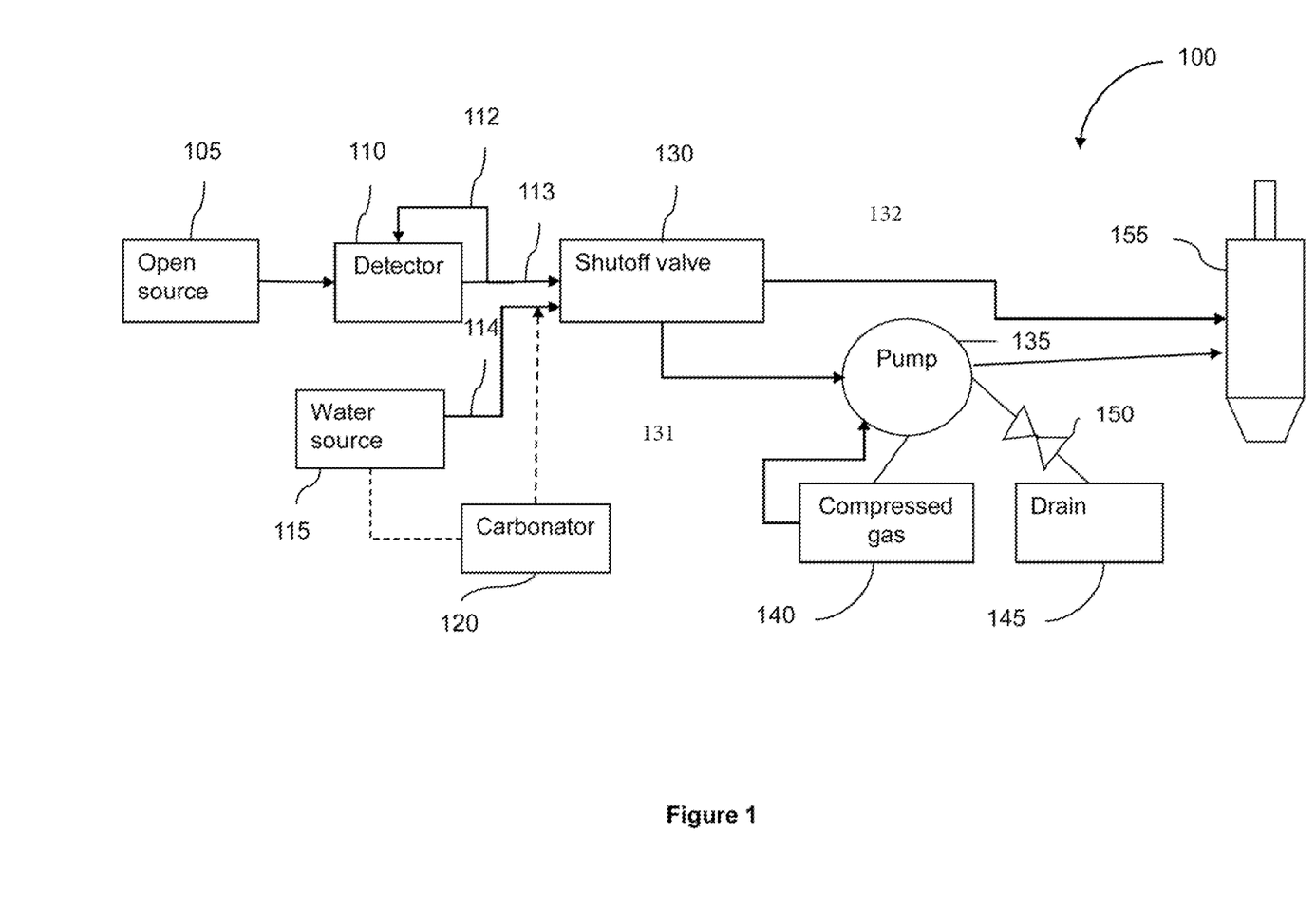
FIG. 1 illustrates a schematic diagram of one embodiment of a beverage dispensing system.

FIG. 1 is a schematic of the beverage dispensing system 100, which is configured to mix the syrup and water at the dispensing tap 155 before dispensing the mix as a beverage. The beverage dispensing system 100 includes a shutoff valve 130 which receives syrups from detector 110 (e.g., a foam on beer detector) via syrup fluid line 113, and water from water source 115 through the water fluid line 114. In a preferred embodiment, the detector 110 is coupled with an open syrup source 105.

As used in this application, the open syrup source 105 can be any type of syrup source that is not sealed from ambient air. For example, the open syrup source 105 can be syrup at least partially exposed to air, moisture, pressure, or temperature of outside of the container where the syrup is contained. Any suitable type of materials can be used for containers of the open syrup source 105. For example, the container can comprise one or more of various materials including wooden materials, metals, plastics, rubbers, paper, glass, etc.

The water source 115 can be any water reservoirs or supply of water that is suitable for human consumption (e.g., city water, tap water, etc). In a preferred embodiment, the water source 115 is configured to store and/or supply pressurized water. In this embodiment, the water is pressurized at least 30 psi, preferably at least 45 psi, more preferably at least 60 psi, and most preferably at least 80 psi.

Optionally, the water source 115 can be coupled with a carbonator 120 to supply carbonated water to the dispenser 155. In this embodiment, the water from the water source 115 flows into the optional carbonator and pumped out from the carbonator to the shutoff valve 130 (water flow is shown in dotted line). Any suitable, commercially available carbonators are contemplated. In a preferred embodiment, a carbonator 120 can be a motorized carbonator that is configured to diffuse $CO_2$ gas to the water and pump the water at more than 80 psi, more preferably more than 150 psi.

The shutoff valve 130 has a syrup inlet to receive syrup from the detector 110 through the syrup fluid line 113 and a syrup outlet 131 to send out the syrup to the pump 135. The shutoff valve 130 also has a water inlet 114 to receive water from the water source (or optional carbonator 120), and a water outlet 132 to send out water to the dispenser 155. Preferably, the shutoff valve 130 has two separate internal chambers (or compartments), each of which is coupled only with syrup inlet and syrup outlet, or with water inlet and water outlet, respectively. In this embodiment, the internal chambers are not fluidly coupled such that water and syrup flowing into the shutoff valve 130 cannot be mixed inside of the shutoff valve 130, and the flow of the syrup and water can be independently controlled in the shutoff valve 130.

In a preferred embodiment, the syrup sent out from the shutoff valve 130 to the pump 135 is further pressurized by compressed gas in the pump 135 before dispensed out to the dispenser 155. In this embodiment, the pump 135 is fluidly coupled with a compressed gas supplier 140 which contains compressed gas (e.g., $CO_2$, Nitrogen, or some combination thereof). The compressed gas supplied from the compressed gas supplier 140 drives the pump 135 with a steady supply of syrup under a predetermined pressure (e.g., at least 30 psi, preferably at least 60 psi, more preferably at least 90 psi, etc.) to the dispenser 155. In some embodiments, the predetermined pressure for supplying the syrup is determined based on the pressure of the water supplied to the dispenser 155. In other embodiments, the predetermined pressure for supplying the syrup can be determined independently from the pressure of the water supplied to the dispenser 155.

In some embodiments, the pump 135 is coupled with a drain 145 via a fluid line and a purge valve 150. The purge valve 150 is configured to regulate the amount of syrup left in the fluid lines in the beverage dispensing system 100. For example, when the syrup level is high enough in the detector 110, the syrup fluid lines should be purged (e.g., emptied or cleaned) so that a vacuum can be applied to the detector 110 for flowing of the syrup out of the detector 110. In this case, the purge valve 150 is opened and any remaining syrups in the syrup fluid lines and the pump 135 can be drained out to the drain 145.

Any suitable type of pump is contemplated. For example, the pump 135 can be a SHURflo® heavy duty gas driven diaphragm pump for dispensing bag-in-box syrups, wines, teas, juices, milk, and water. Preferably, the pump 135 features automatic demand and automatic shut-off for ease of operation. For example, when the syrup supply is constant and continuous, the pump 135 automatically draws off the compressed gas from the compressed gas supplier 140. When the syrup level is low or the supply of the syrup to the pump 135 is not constant or continuous, the pump 135 shuts off automatically so that the pump 135 does not operate without syrups to dispense to the dispenser 155.

Any suitable type of compressed gas can be used to pressurize the syrup in the pump 315. For example, the compressed gas can be carbon dioxide ($CO_2$), nitrogen, clean compressed air, or any mixtures of those gases.

Figure 2A:
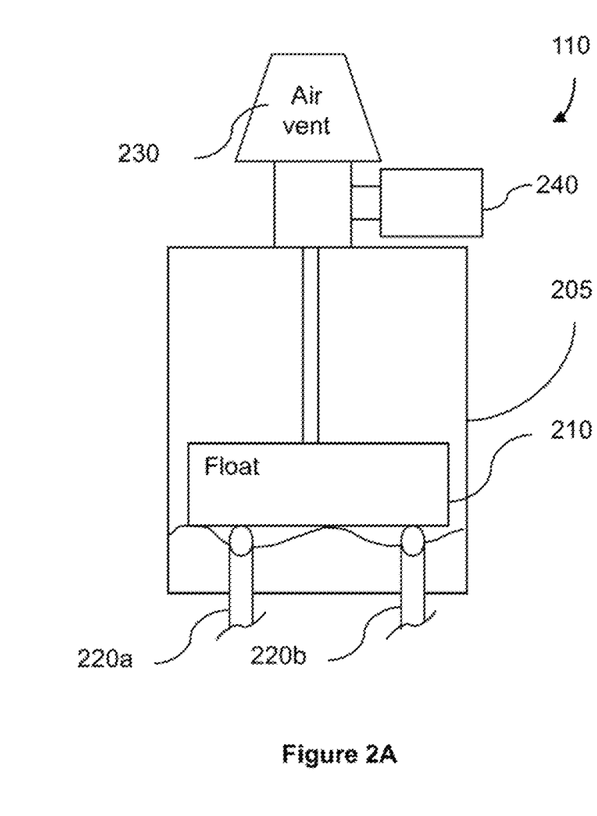
FIG. 2A illustrates one embodiment of an open source syrup tank in a shutoff mode.
Figure 2B:
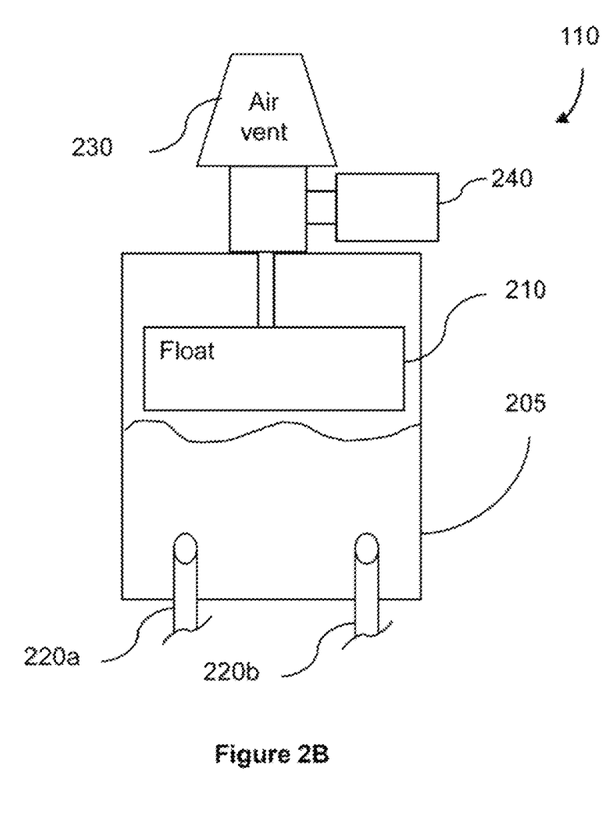
FIG. 2B illustrates the open source syrup tank of FIG. 2A in a flow mode.

FIGS. 2A and 2B show one embodiment of the detector 110 in a shutoff mode (FIG. 2A) and an open mode (FIG. 2B). The detector 110 includes a body 205, an air vent 230, a purge button 240. The body is coupled with one or more fluid lines 220a, 220b through which syrup is supplied from the open syrup source 105 (e.g., through the fluid line 220a) or supplied to the shutoff valve 130 (e.g., through the fluid line 220b). In a preferred embodiment, the length of fluid lines 220a, 220b inserted to the body 205 is at least 1%, preferably at least 5%, more preferably at least 10% of the of the height of the body 205.

In a preferred embodiment, the detector 110 further includes a float 210 coupled with the air vent 230 and the body 205. In some embodiments, the float 210 is configured to move upwardly when the air pressure inside the body 205 becomes sub-ambient, and move downwardly when the air pressure inside the body 205 becomes ambient pressure or above. For example, when the open syrup source 105 empties, air can be drawn into the body 205 of the detector 110 via the fluid line coupling the open syrup source 105 and the body 205. As air enters the body 205, the air pressure inside the body 205 raises, which causes the float 210 move downwardly.

In other embodiments, the float 210 is configured to move upwardly or downwardly depending on the liquid level (e.g., syrup) in the body 205. In these embodiments, when the open syrup source 105 empties, air can be drawn into the body 205 of the detector 110 via the fluid line coupling the open syrup source 105 and the body 205 instead of syrup. As the syrup level drops down, the float 210 moves downwardly according to the syrup level. The downward movement of the float 210 blocks the fluid line 220b to prevent the flow of the syrup form the detector 110 to the shutoff valve 130.

When the open syrup source 105 is filled up, the float 210 can move upwardly. In some embodiments, the movement of float 210 is controlled by manual purging operation by a user. In these embodiments, when the open syrup source 105 is filled up, the user opens the purge valve 150 and presses purge button 240 coupled with the air vent 230 to purge the syrup fluid lines. Once the syrup fluid lines are purged, the user closes the air vent 230 and pushes the purge button 240. Once the air vent 230 is closed and purge button 240 is pushed, vacuum will be applied inside the body 205 of the detector 110, which allows syrup to be drawn into the body 205 via the fluid line 220a. As the syrup level raises inside the body 205, the float 210 raises accordingly. Then, user can close the purge valve 150 and opens the air vent 230. The upward movement of the float 210 opens the fluid line 220b to allow the flow of the syrup form the detector 110 to the shutoff valve 130.

Figure 3:
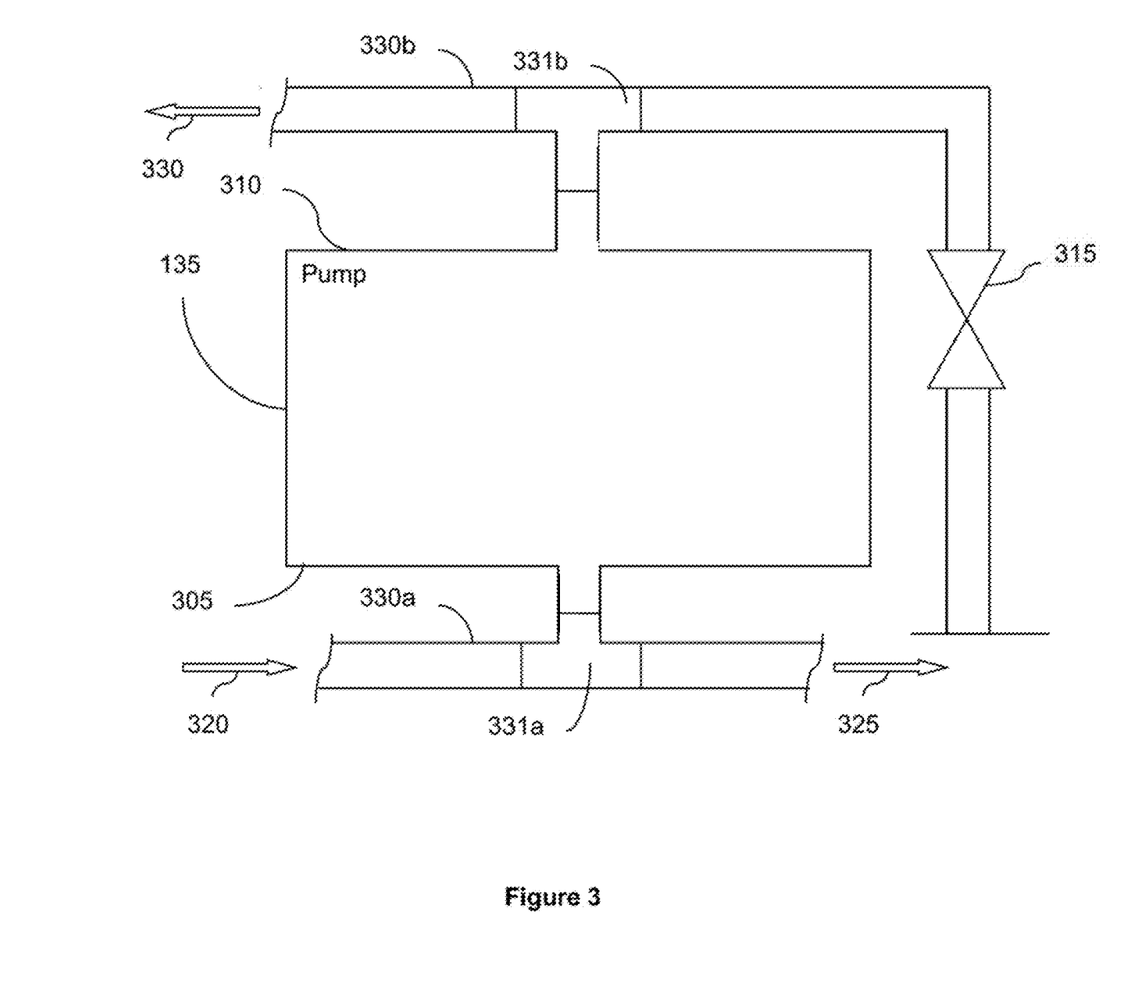
FIG. 3 illustrates one embodiment of pump and valve assembly in the beverage dispensing system of FIG. 1.

FIG. 3 shows one embodiment of pump 135 coupled with fluid lines 330a, 330b. The pump 135 has a body with an upper end 310 and a bottom end 305, which are coupled with an upper fluid line 330b and bottom fluid line 330a, respectively. The bottom fluid line 330a is coupled with the shutoff valve 130 and receives the syrup from the shutoff valve 130 (flow direction is shown in arrow 320). The syrup flowed from the shutoff valve 130 passes through a bottom T-valve 331a and enters the pump 310. Then, the syrup is pumped out from the pump 310 to the upper fluid line 330b (flow direction is shown in arrow 330) through an upper T-valve 331b at the upper end 310.

When the syrup fluid line should be purged (e.g., when the open syrup source 105 is filled up, etc.), the purge button 240 is pressed and the purge valve 150 is opened. Then, the syrup flown from the shutoff valve 130 is purged out (e.g., to a drain) without entering the pump 135 (direction shown in arrow 325). The syrup left on the upper fluid line 330b flows to the drain via the purge valve 315 without being pumped out to the dispenser.

Figure 4:
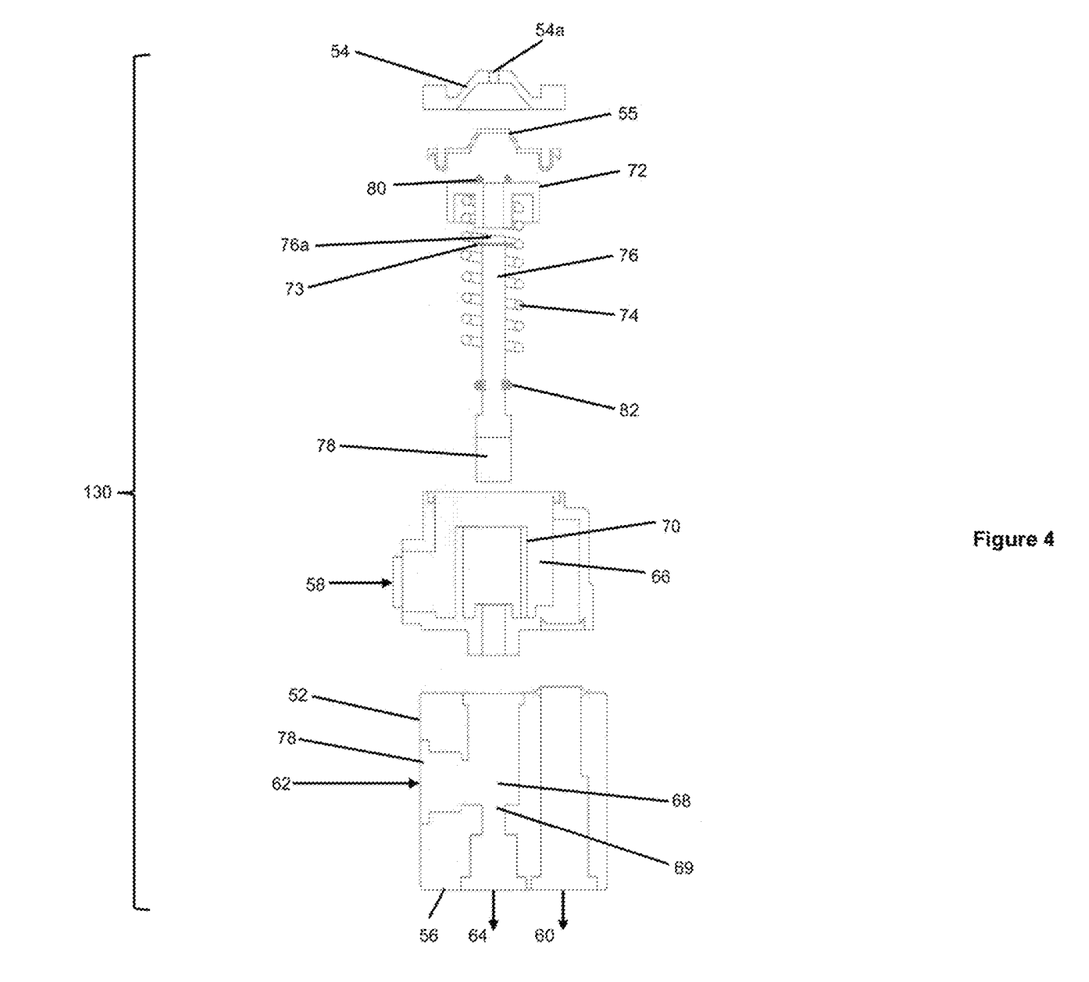
FIG. 4 is an exploded cross-sectional view of a shutoff valve.

FIG. 4 shows an exploded view of shutoff valve 130. Shutoff valve 130 has a body part 52. In some embodiments, the body part 52 comprises molded plastic. However, it is also contemplated that any suitable type of materials can be used for body part 52. For example, the body part 52 can comprise one or more of various materials including wooden materials, metals, rubbers, paper, glass, etc.

In a preferred embodiment, body part 52 is coupled with an integral base 56 and walls defining syrup in port 58, syrup out port 60, water in port 62, and water out port 64. In some embodiments, body part 52 is additionally coupled with a hard cap 54 that has a vent 54a to vent the interior of body part 52.

The interior of body 52 defines a syrup chamber 66 and a water chamber 68, which comprises two separate sections fluidly sealed from one another: the syrup chamber 66 with syrup in port 58 and syrup out port 60, as well as the water chamber 68 with water in port 62 and water out port 64. Water chamber 68 also has walls defining a chamber seat 69.

At least a part of the interior walls of body part 52 comprises a spring shell 70, which contains a spring 74. During the operation of shutoff valve, the spring shell 70 at least partially opens so that syrup can flow between syrup in port 58 and syrup out port 60, through the spring shell and past the coils of spring 74.

Located at a removed end of spring shell 70 is an end cap 72 which engages a spring clip 73. Spring clip 73 is adapted to engage the removed end of spring 74 which in turn engages walls at a base of spring shell 70.

When assembled, actuator rod 76 engages the underside of soft cap 55. In a preferred embodiment, soft cap 55 comprises an elastomeric material (e.g., rubber, etc). However it is also contemplated that any suitable type of materials can be used for soft cap 55. For example, the soft cap 55 can comprise one or more of various materials including metals, paper, fabrics, etc.

Actuator rod 76 has a first end 76a which spring 74 urges upward and engages the underside of soft cap 55 when shutoff valve 130 is in the flow condition. In the flow condition, plug end 78 of actuator rod 76 is off of seat 69 and spring 74 is in a generally uncompressed condition. O-ring or other appropriate fluid seals 80, 82 allow actuator rod 76 to slide responsive to a change in the syrup end condition as set forth in more detail below, while maintaining a fluid-tight seal.

During the operation of the shutoff valve 130, actuator rod 76 slides in a downward direction if there is strong suction acting in the syrup chamber, as when the foam on beer detector 26 is in shutoff mode. Thus, in a normal operating condition with the pump drawing syrup through syrup chamber 66, spring 74 will maintain actuator rod 76 substantially in the plug off condition (flow) (some slight up and down responsive to pumping action). But when syrup runs low and air is drawn in to foam on beer detector 26, the syrup chamber 66 is placed in a sub-ambient pressure condition and ambient air pressure vent 54a allows soft cap 55 to flex downward with slight compression on spring 74 in a plug seat position. A plug seat condition shuts water flow from out port 64 and leaves water chamber 68 pressurized from the upstream city water or other pressurized water source. However, when a fluid source 12 is plugged in upstream of foam on beer detector 26, the syrup drawn through the body and the actuator rod follows return of soft cap 55 to the flow condition.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A shutoff valve system for dispensing a beverage, comprising:
   a first inlet on a shutoff valve to receive syrup from a syrup tank, a first outlet on the shutoff valve dispensing the syrup to a pump;
   a second inlet on the shutoff valve to receive water, and a second outlet on the shutoff valve dispensing the water to a dispensing point, wherein the syrup and the water are combined at the dispensing point to form the beverage;
   a soft cap;
   an actuator rod having a first and a second end within the shutoff valve, the first end of the actuator rod configured to block the second outlet in response to a first pressure change at the first inlet, and the second end of the actuator rod in direct communication with a first side of the soft cap; and
   a spring that biases the actuator rod upward and into the first side of the soft cap;
   wherein the actuator rod slides downwardly in response to the first pressure change;
   wherein the first pressure change is caused by reaching an empty state in the syrup tank; and
   wherein the spring is disposed below the second end of the actuator rod, and wherein the first pressure change causes the soft cap to transition to a downward flex in opposition to the bias.

2. The system of claim 1, further comprising a detector having a volume and comprising a syrup inlet, a syrup outlet, and a float, the detector coupled via the syrup inlet to the syrup tank and via the syrup outlet to the shutoff valve.

3. The system of claim 2, wherein the float is configured to drop as ambient air enters the detector through the syrup inlet, or a volume of the syrup in the detector decreases.

4. The system of claim 1, wherein the second inlet receives water from a water tank, and the water tank is coupled with a carbonator.

5. The system of claim 1, wherein the actuator rod slides downwardly, in opposition to the bias, when the soft cap flexes downwardly, such that the first end of the actuator rod blocks the second outlet.

6. The system of claim 1, wherein the shutoff valve has (i) a first chamber coupled to the first inlet and outlet, and (ii) a second chamber coupled to the second inlet and outlet, wherein the first and second chambers are fluidly sealed from each other, and wherein the actuator rod traverses the first and second chambers.

7. The system of claim 1, wherein the first pressure change is a sub-ambient pressure condition at the first inlet.

8. The system of claim 1, wherein the soft cap comprises an elastomeric material.

9. The system of claim 1, wherein the soft cap flexes upwardly to a rest position in response to a second pressure change.

10. The system of claim 9, wherein the second pressure change is equal or above ambient pressure condition at the first inlet.

11. The system of claim 9, wherein the actuator rod slides upwardly, under force from the bias when the soft cap flexes outwardly, such that the first end of the actuator rod unblocks the second outlet.

12. The system of claim 1, wherein the water does not flow through the pump.

13. The system of claim 1, wherein the pump is operated by a compressed gas.

14. The system of claim 1, further comprising a hard cap substantially covering a second side of the soft cap.

15. The system of claim 14, further comprising a vent in the hard cap, wherein the vent exposes the second side of the soft cap to ambient pressure.

16. The system of claim 14, wherein the hard cap has a shape complementing a shape of the soft cap when in a rest position.

17. The system of claim 1, wherein downward flex of the soft cap presses the soft cap against the second end of the actuator rod such that the actuator rod slides in opposition to the bias.

\* \* \* \* \*